Nov. 30, 1965  R. S. RAE  3,220,183
ENGINE
Original Filed March 22, 1954  6 Sheets-Sheet 1

RANDOLPH SAMUEL RAE,
INVENTOR.

BY R. E. Geauque
ATTORNEY.

Nov. 30, 1965  R. S. RAE  3,220,183
ENGINE

Original Filed March 22, 1954  6 Sheets-Sheet 3

RANDOLPH SAMUEL RAE,
INVENTOR.

BY R. E. Geangue

ATTORNEY.

Nov. 30, 1965    R. S. RAE    3,220,183
ENGINE
Original Filed March 22, 1954    6 Sheets-Sheet 4
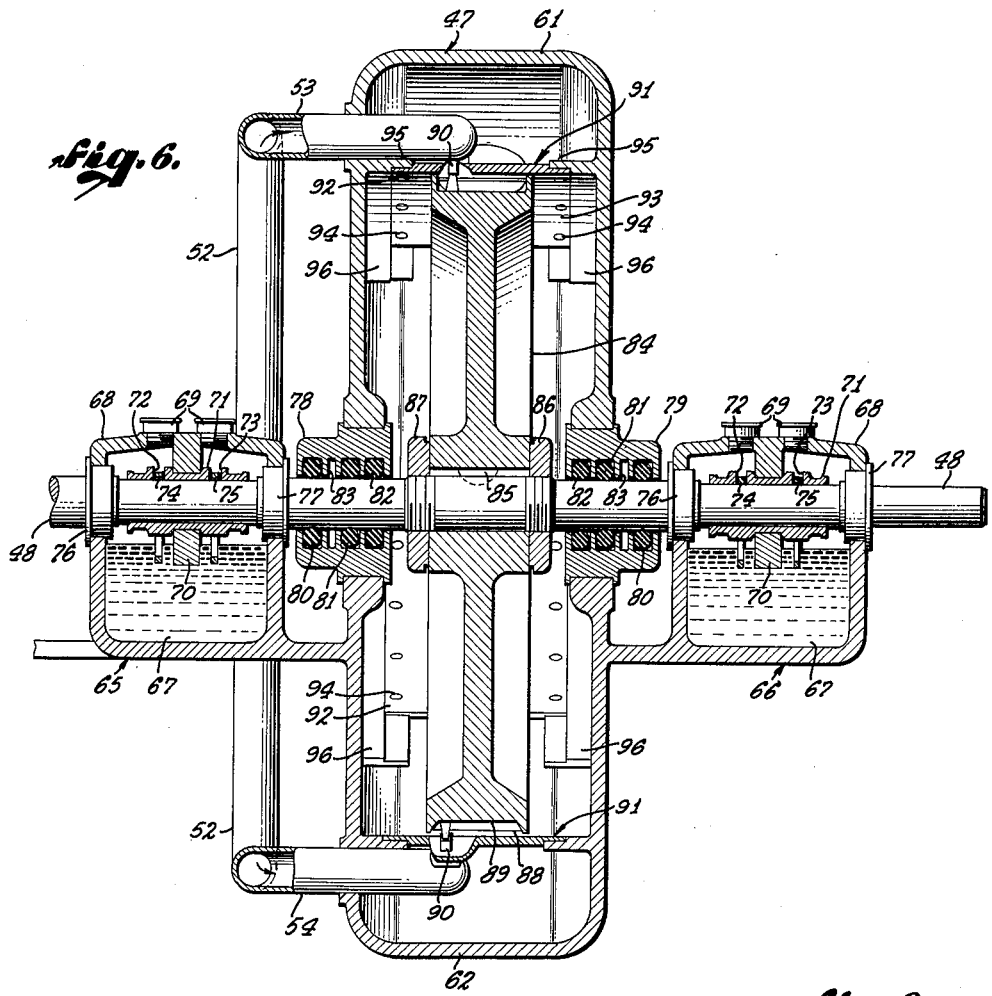
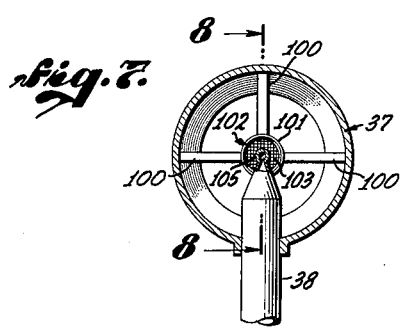
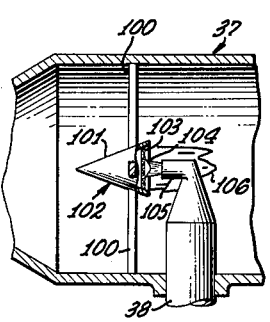
RANDOLPH SAMUEL RAE,
INVENTOR.
BY R. E. Geauque
ATTORNEY.

Nov. 30, 1965
R. S. RAE
3,220,183
ENGINE
Original Filed March 22, 1954
6 Sheets-Sheet 5
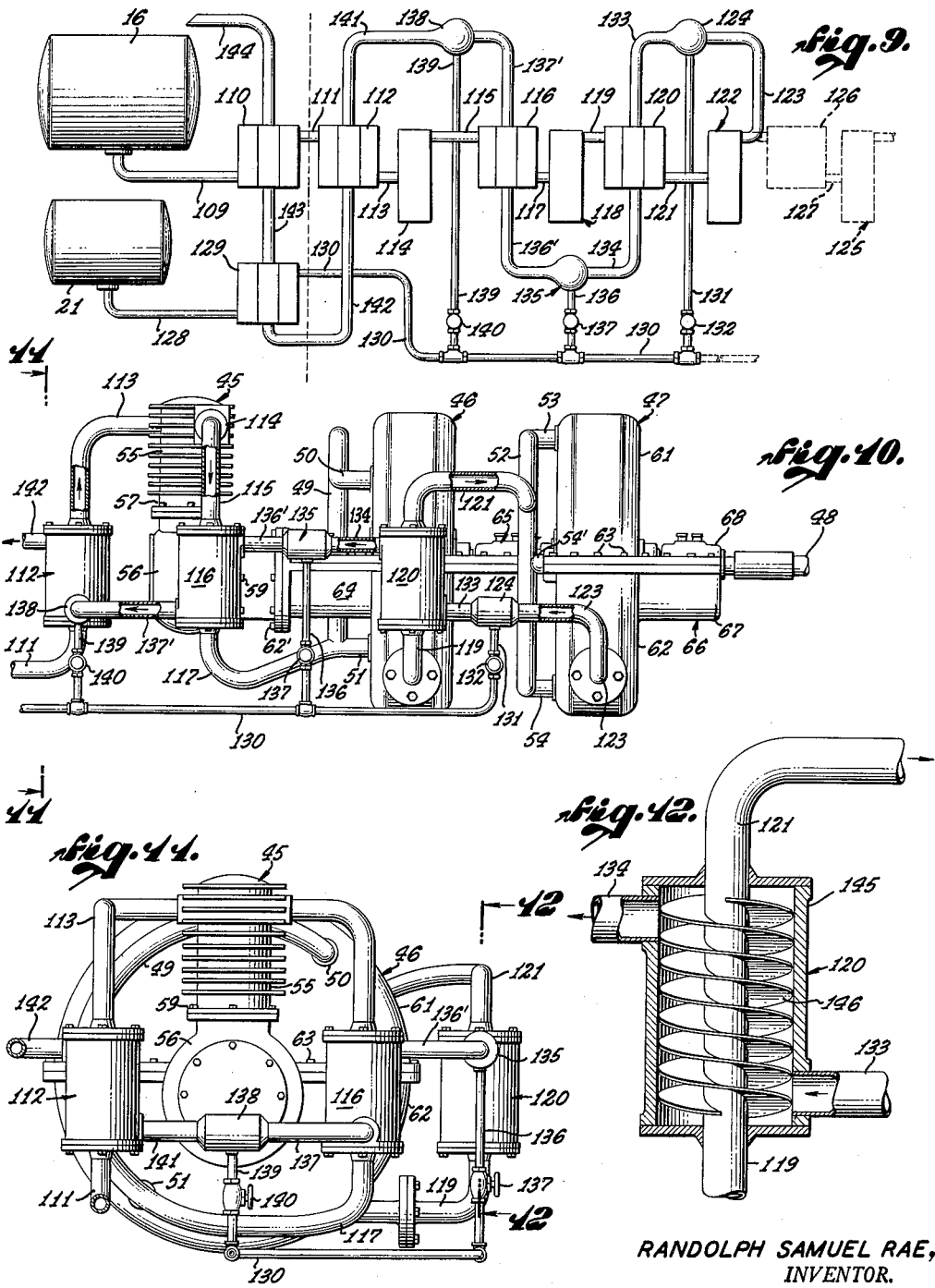
RANDOLPH SAMUEL RAE,
INVENTOR.
BY R. E. Geauque
ATTORNEY.

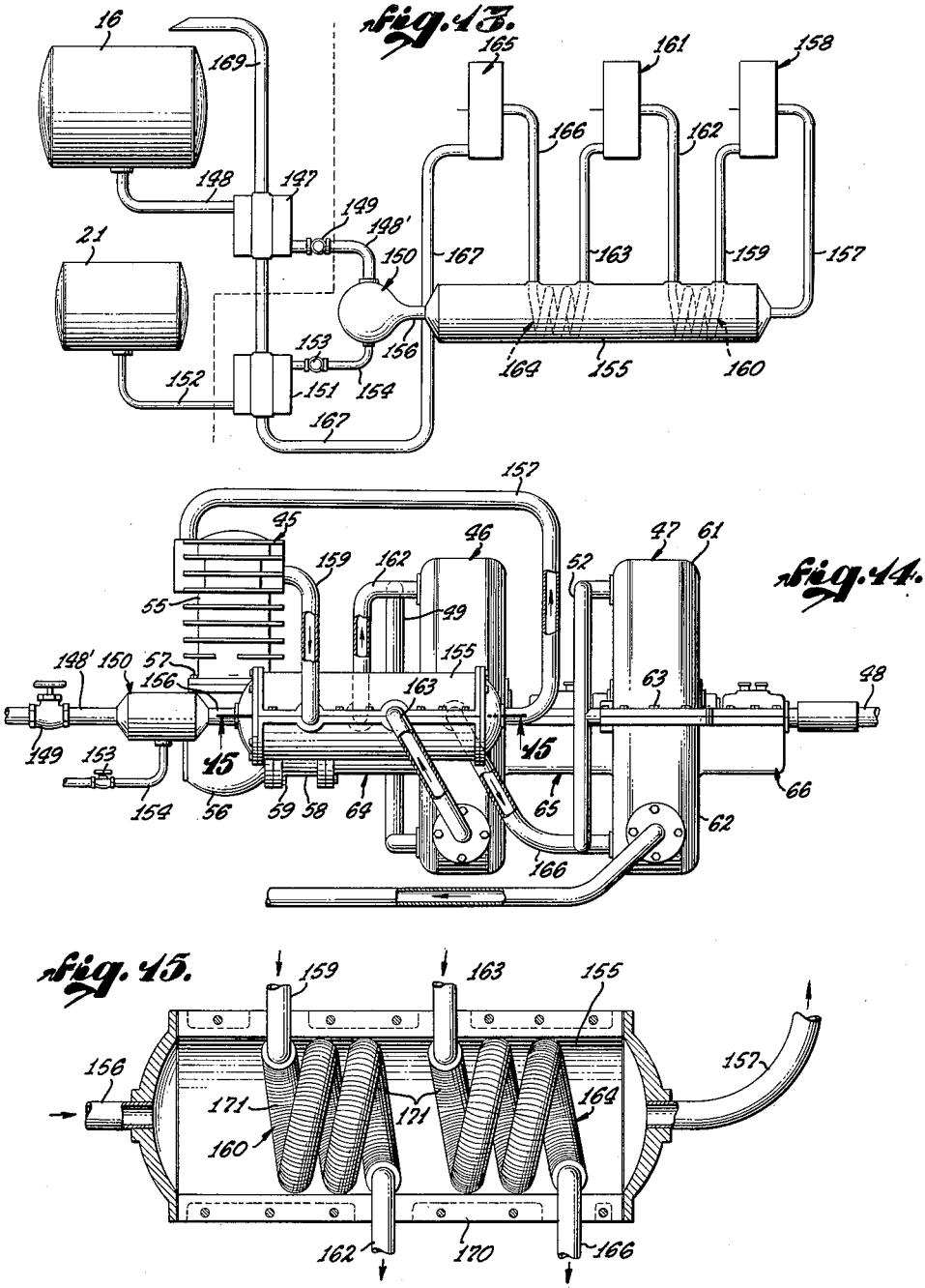

3,220,183
ENGINE
Randolph Samuel Rae, Los Angeles, Calif., assignor to The Garrett Corporation, Los Angeles, Calif., a corporation of California
Original application Mar. 22, 1954, Ser. No. 417,867. Divided and this application Dec. 11, 1961, Ser. No. 159,820
2 Claims. (Cl. 60—39.17)

This application is a division of application Serial No. 417,867, filed March 22, 1954 by Randolph Samuel Rae and entitled Non-Air Breathing Engine, now abandoned.

This invention relates to an engine capable of operating efficiently independently of the medium surrounding the engine and more particularly to a prime mover for vehicles such as airplanes, rockets, submarines and torpedoes, which will have the same order of efficiency as air breathing engines.

At very high altitudes and for underwater operation, there is practically no air available for the combustion of fuel in an internal combustion engine and therefore it is impossible for such an engine to produce power economically. In the case of rockets, the propellant supplies the needed oxygen but rocket engines have extremely low efficiency. By the present invention, an engine is provided in which the oxidant is carried apart from the fuel and no great penalty is paid for the weight of oxidant carried because of the high thermal efficiency of the engine.

But for temperature limitations of the blades in a turbine, adequate amounts of the energy of a rocket fuel could be converted into mechanical work due to the fact that high pressure ratios could be used. This temperature limitation can be overcome by diluting the rocket gases. Hydrogen, due to its high specific heat value, about ten times greater than most gases, is the best material to use as a diluent. Further, as hydrogen is also one of the best fuels, it could be used for both purposes. High pressure ratios can be used in the working cycle of this gas engine because both hydrogen and oxygen can be carried as liquid and therefore could be compressed to high pressure with but a small expenditure of energy and without any appreciable increase in temperature.

By the use of several expansion stages in the engine, it is possible to limit the temperature in each stage to that which can be withstood by the materials now in use in practical engines. The efficiency obtainable from the engine of the present invention is of the same order as that obtained from internal combustion engines at sea level and since the engine operates independently of its environment, this same efficiency can be obtained at very high altitudes or in other environments where it would be impossible to operate the usual type of internal combustion engine to produce power economically. The type of prime mover utilized for each stage of the engine can be any type of fluid expansion engine, such as a gas engine or turbine, and therefore considerable flexibility in the design of the engine is possible.

It is therefore an object of the present invention to provide an engine which is capable of operating efficiently independently of the medium surrounding the vehicle so that the engine can be operated efficiently in surrounding where practically no air is available.

Another object of the invention is to provide an engine for vehicles having the oxidant carried separately from the fuel and compressed to high pressures to provide a high efficiency in the working cycle.

A further object of the invention is to provide an engine comprised of a number of stages so that the operating temperature of each stage can be held to within the range of operating temperatures permitted by the construction materials.

Another object of the invention is to provide a non-air breathing engine whose output is independent of the environment of the engine and whose efficiency on the basis of fuel weight carried is of the same order as air breathing internal combustion engines operating at ground level.

These and other objects of the invention not specifically set forth above will become readily apparent from the following description and drawings in which:

FIGURE 6 is a vertical sectional view along line 6—6 of FIGURE 3 illustrating the mounting of one of the turbine rotors.

FIGURE 7 is a vertical sectional view along line 7—7 of FIGURE 3 illustrating one of the combustion chambers.

FIGURE 8 is a transverse sectional view along line 8—8 of FIGURE 7 illustrating the flame holder contained within the combustion chamber.

FIGURE 9 is a diagrammatic view of a modification of the invention wherein heat exchanges are positioned ahead of each of the stages of the engine.

FIGURE 10 is a side elevational view of a physical form of the modification illustrated in FIGURE 9.

FIGURE 11 is an end elevational view taken along line 11—11 of FIGURE 10 illustrating the arrangement of the heat exchangers.

FIGURE 12 is a vertical sectional view along line 12—12 of FIGURE 11 showing the internal construction of one of the heat exchangers.

FIGURE 13 is a diagrammatic view of a second modification of the invention wherein a single combustion chamber is used for all stages.

FIGURE 14 is a side elevational view of a physical form of the second modification of the invention showing the arrangement of the engine stages.

FIGURE 15 is a sectional view along line 15—15 of FIGURE 14 showing the heat exchange coils located within the heat exchange chamber.

Figure 1:
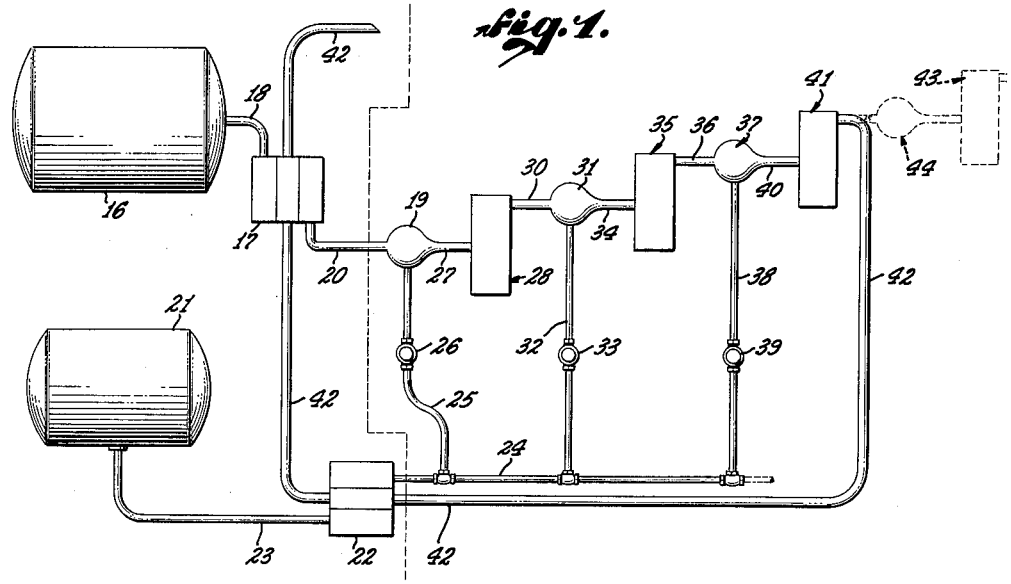
FIGURE 1 is a diagrammatic view of a first form of the invention wherein each stage of the engine is supplied from a separate combustion chamber.

Referring to the embodiment of the invention illustrated in FIGURE 1, a fuel tank 16 is connected to heat exchanger 17 by means of a passage 18 and the combustion chamber 19 is connected to heat exchanger 17 through passage 20 so that fuel leaving the tank 16 will be heated in the heat exchanger 17 prior to entering the combustion chamber 19. Any suitable type of liquid or gaseous fuel can be utilized such as liquid hydrogen, gasoline, methane, acetylene, alcohol and the like, and the liquid or gaseous fuel can be compressed to a high pressure within tank 16 in order to obtain a high efficiency in the working cycle of the engine. A separate tank 21 is utilized to carry the oxidant for the engine and the tank is connected to a heat exchanger 22 by a pasage 23. The combustion chamber 19 is connected to heat exchanger 22 by a passage 24 and a passage 25 containing valve 26 for regulating the amount of oxidant supplied to the combustion chamber. Any suitable type of oxidant, such as oxygen, hydrogen peroxide, nitric acid, etc., can be utilized in either the liquid or gaseous phase and can be held under high pressure in tank 21 to increase the efficiency of the engine. When liquid fuel and oxidant are used, both will be vaporized before entering the combustion chamber by heat exchangers 17 and 22, respectively, and the amount of oxidant will be controlled by valve 26 so that the temperature of the gases leaving the combustion chamber will be the maximum that can be withstood by the construction materials of the first stage. The combustion chamber 19 is connected by passage 27 to the first stage 28 and the passage 27 will contain both gaseous fuel and byproducts of the combustion reaction. For instance, when liquid hydrogen is utilized as the fuel, and liquid oxygen as the oxidant, the passage 27 will contain both hydrogen and steam resulting from combustion of part of the hydrogen, whereas, if a hydrocarbon is utilized as the fuel, the passage 27 will contain an amount of hydrocarbon plus the various combustion products, such as carbon dioxide, carbon monoxide and steam.

The first stage 28 of the engine will exhaust a lower temperature through a passage 30 to a second combustion chamber 31 and a regulated amount of oxidant will be led to the combustion chamber from passage 24 through passage 32 and valve 33. In combustion chamber 31, some more of the fuel will be ignited with sufficient oxidant to raise the temperature in passage 34 to that which can be withstood by the second stage 35 of the engine and the combustion in chamber 31 will reduce the amount of fuel and increase the products of the combustion. The stage 35 exhausts through passage 36 to a third combustion chamber 37 and the expansion of the gases in stage 35 will result in a lower temperature in passage 36. Additional oxidant is added to combustion chamber 37 from passage 24 through passage 38 and valve 39 and the amount of oxidant is controlled by the valve 39 so that the temperature in passage 40 leading from the combustion chamber 37 will be raised until it is at the temperature which can be withstood by the third stage 41 of the engine. The stage 41 exhausts to passage 42 which passes through the heat exchangers 22 and 17 and then to atmosphere in order to heat the oxidant entering heat exchanger 22 and the fuel entering heat exchanger 17.

It is understood that any number of stages can be added to the engine such as stage 43 having a combustion chamber 44 and that the oxygen can be supplied to combustion chamber 44 from the passage 24. In general, a practical number of stages will be utilized so as to obtain a reasonable compromise between the specific fuel consumption and the mechanical complexity for the particular application under consideration. The temperature of the gases leaving the combustion chambers is regulated by the amount of oxidant supplied to the combustion chambers through the valves 26, 33, and 39. It is not necessary that the fuel and oxidant be at high pressure in tanks 16 and 21 respectively since pumps can be added to passage 18 and 23 in order to increase the pressure in these passages leading to the heat exchangers 17 and 22, respectively. Also, it is understood that any one of the stages could consist of any suitable type of power producing unit, such as a gas engine or turbine of any well known type. The engine of the present invention operates independently of the atmosphere since the engine carries its own fuel and oxidant supply and each stage of the engine operates at the highest possible temperature in order to obtain maximum efficiency from each stage.

Figure 2:
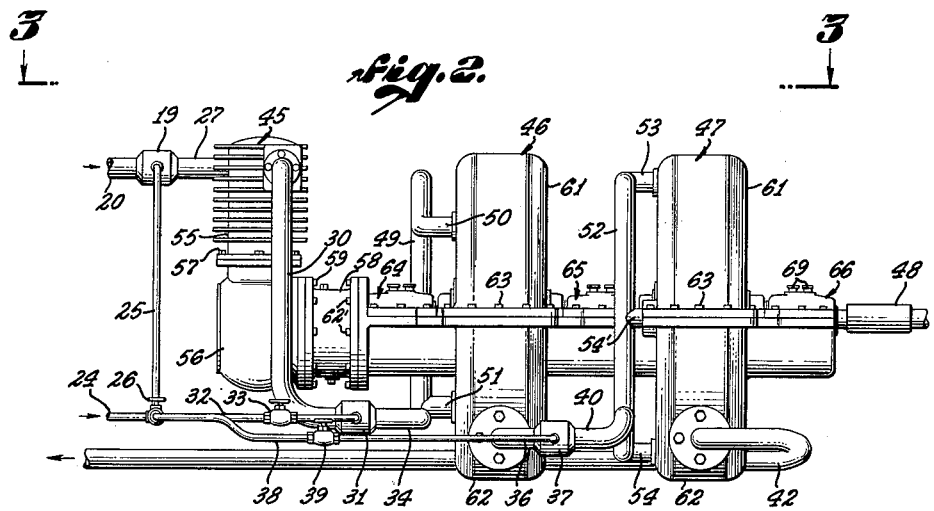
FIGURE 2 is a side elevational view of a physical form of the engine illustrated in FIGURE 1 showing a gas engine as the first stage and helical flow turbines as the second and third stages.
Figure 3:
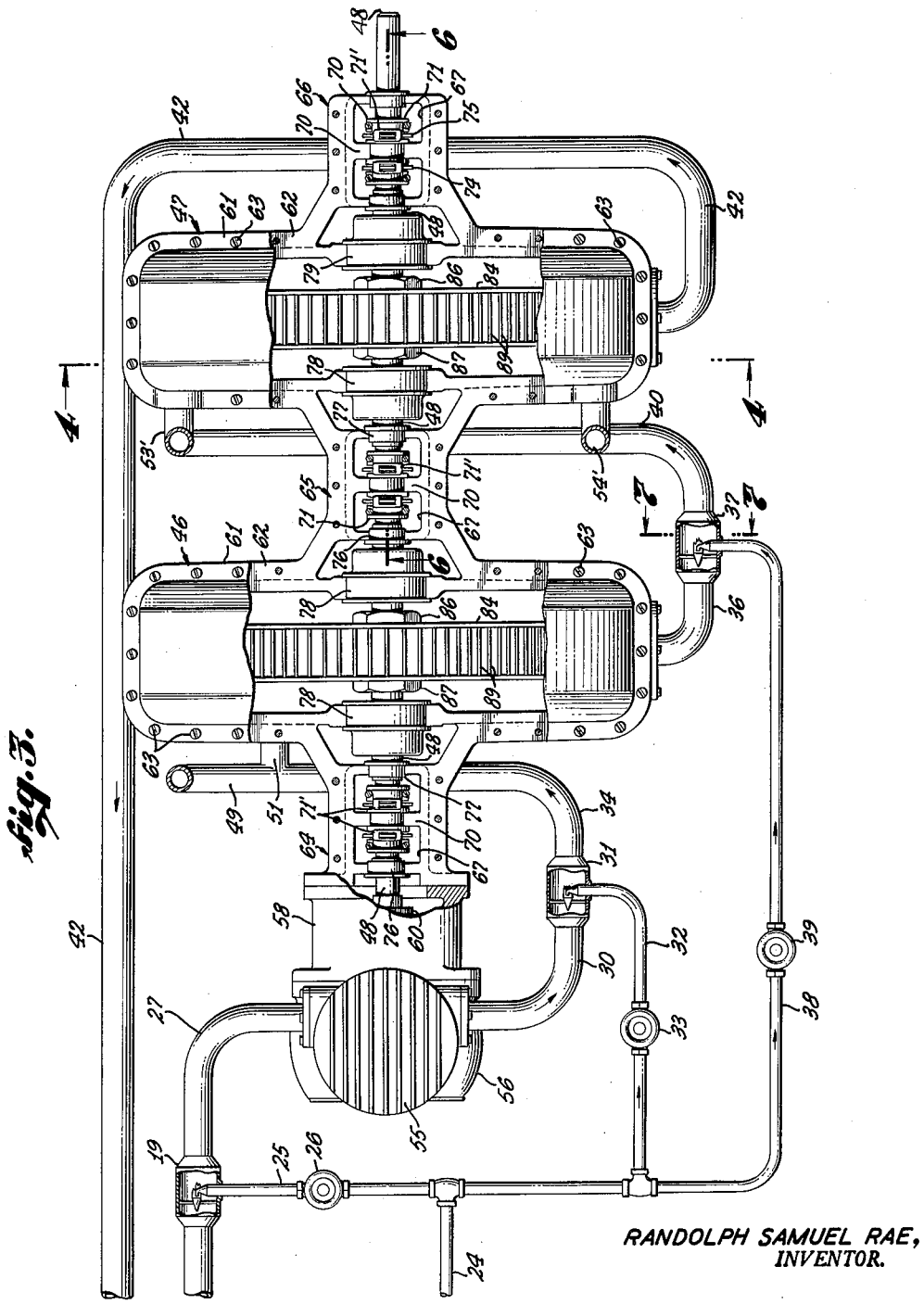
FIGURE 3 is a top plan view of the engine, partly in section, taken along line 3—3 of FIGURE 2 illustrating the manner in which the various stages of the engine are connected together.
Figure 4:
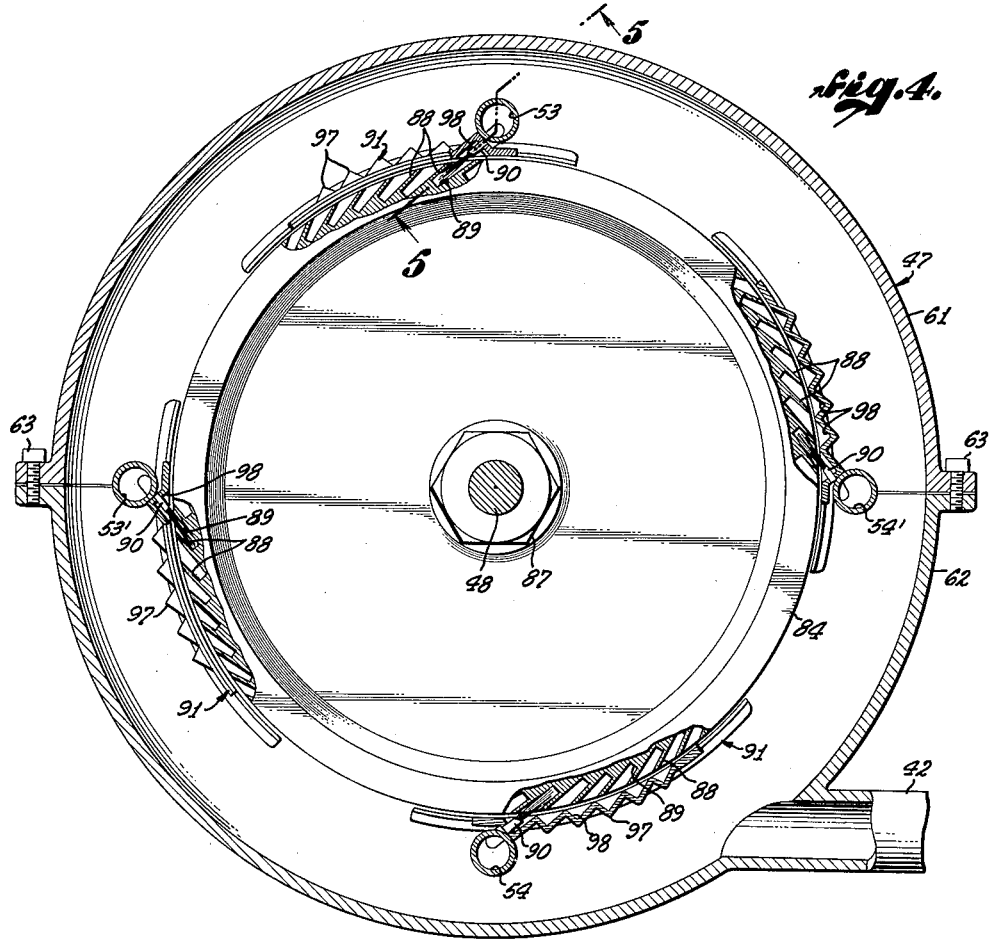
FIGURE 4 is a transverse vertical section along line 4—4 of FIGURE 3 illustrating the construction of one of the helical flow turbines.
Figure 5:
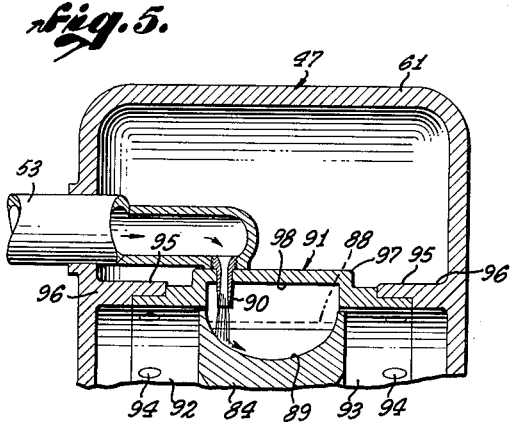
FIGURE 5 is a sectional view along line 5—5 of FIGURE 4 showing one of the nozzles for the helical flow turbines.

A physical embodiment of the invention is shown in FIGURE 2 wherein like reference numerals refer to like parts as in the diagrammatic view of FIGURE 1. In this physical form, the first stage 45 of the invention is comprised of gas expansion engine while the second and third stages consist of helical flow turbines 46 and 47 respectively, all of which stages are connected to a common shaft 48. The common passage 24 is shown connected to combustion chambers 19, 31 and 37 through passages 25, 32 and 38, respectively, which contain valves 26, 33 and 39 for controlling the amount of oxidant admitted to each of the combustion chambers. The combustion chamber 19 connects with engine 45 through passage 27, and the engine exhausts to combustion chamber 31 through passage 30. The combustion chamber 31 connects with manifold 49 of turbine 46 through passage 34 and the manifold has two inlets 50 and 51. The turbine 46 exhausts through passage 36 to combustion chamber 37 which is connected through passage 40 to intake manifold 52 having four inlet passages 53, 53', 54 and 54' for turbine 47. The exhaust passage 42 of the last stage turbine 47 passes through heat exchangers 22 and 17 and then to atmosphere.

The gas engine 45 has a single, air-cooled cylinder 55 secured to crankshaft casing 56 by screws 57 and a gear box 58 is secured to casing 56 by screws 59. The engine crankshaft (not shown) is contained within casing 56 and is connected to a gear train 60 located in gear box 58. The gear trains is connected to the common shaft 48 so that the output of the engine is geared up to correspond with the speed of the turbines 46 and 47. The helical flow turbines 46 and 47 have a divided casing comprised of casing sections 61 and 62 which are secured together by means of a number of screws 63 and the casing sections form bearing container sections 64, 65 and 66, with one bearing section positioned on opposite sides of each turbine. Each of the bearing retainer sections is comprised of a lubricating well 67 formed in casing section 62 and a cover member 68 formed in casing section 61 and having lubricating openings 69. A bearing support 70 is formed integral with cover 68 and retains a bearing 71 which supports the shaft 48. Each bearing has slits 72 and 73 on opposite sides of support member 70 for receiving lubricating rings 74 and 75, respectively, which are retained in the slits by a cover 71'. A portion of each of the rings is emerged in the lubricating fluid in space 67 in order to continually supply lubricant to the bearing during rotation of the rings by shaft 48. Each of the bearing retainer sections 64, 65, and 66 have sealing rings 76 and 77 at opposite sides of the sections in order to retain the lubricant. The casing sections 61 and 62 are also sealed against leakage of high pressure gases by members 78 and 79, each of which has three grooved spaces for receiving sealing rings 80, 81 and 82 and also a groove 83 which exhausts to atmosphere.

Each of the turbines 46 and 47 has a rotor 84 which is secured to shaft 48 by means of key 85 and is positioned along the shaft between nuts 86 and 87 threaded to the shaft on opposite sides of the rotor hub. Each rotor has a number of blades 88 continuous around the periphery of the rotor and these blades define a number of reversing chambers or buckets 89 which are semicircular. The inlet manifold 49 for turbine 46 has two branches while the inlet manifold 52 for turbine 47 has four branches and each branch of both manifolds leads to a nozzle 90 positioned at one end of a reversing plate 91. Each plate 91 has curved flanges 92 and 93 which are secured by means of rivets 94 to flanges 95 of projections 96 carried by casing sections 61 and 62. The reversing plate 91 with flanges 92 and 93 are curved to conform to the outer periphery of the turbine rotor and each plate 91 has a number of sections 97 forming cavities 98 which are spaced to cooperate with the buckets 89 as they pass the reversing plate in order to give a swirling motion to the gases. The reversing plates are illustrated as having five cavities which are continuously opposed to five of the buckets 89 and after each bucket passes beyond the reversing plate, it is free to exhaust to the inside of the casing and then to either exhaust passage 36 or 42. Each nozzle 90 is secured into the end of one of the inlet branches and passes through the section 97 at the end of the reversing plate so that the gases enter the buckets 89 at one side thereof. It is understood that the gases, swirling within the chambers defined by the buckets 89 and spaces 98, serve to rotate the turbine rotor and to drive the shaft 48.

The detailed construction of combustion chamber 37 is illustrated in FIGURE 7 and combustion chambers 19 and 31 are identical in construction. Four struts 100 within the chamber support a conical section 101 of flame holder 102 and the base of the section 101 supports a wire mesh disc 103 on which is deposited finely divided platinum 104. The oxidant supply passage 38 projects into the combustion chamber and has a nozzle end 105 which directs the oxidant against the finely divided platinum so that the platinum acts as a catalyst to maintain the flame 106 during operation of the engine. Thus, continuous ignition of a certain portion of the fuel will take place at each combustion chamber and the amount of fuel ignited will depend upon the amount of oxidant passing into each of the combustion chambers through the oxidant supply passages. Other types of flame holders such as an electric spark plug, can be utilized in place of the finely divided platinum.

While the stages of the engine have been described as composed of a gas engine 45 and two helical flow turbines 46 and 47 it is understood that any other suitable type of prime mover could be incorporated at any stage of the engine and that any number of stages could be utilized so as to obtain the maximum efficiency from the engine. The gas engine 45 is of the usual well-known construction and the construction of the helical flow turbines has been illustrated as one example of the type of power unit that can be used for any stage of the engine. The operation of the physical form of the invention will be the same as described in connection with the diagrammatic form of FIGURE 1 wherein fuel is supplied to the first combustion chamber through heat exchanger 17 and oxidant is supplied to the first combustion chamber through heat exchanger 22. It is noted that the manifold for turbine 46 contains only two inlets while the manifold for turbine 47 requires four inlets because of the expanded volume of gases passing through the turbine 47. The engine of this invention, comprises stages which operate at maximum efficiency because the temperature at each of the stages is the maximum which can be used with available construction materials. The temperature at the inlet of each of the stages is, of course, controlled by the valves in the oxidant passages and the temperature at the inlet of each stage can be varied by varing the supply of oxidant.

A first modification of the invention is diagrammatically illustrated in FIGURE 9 and in this modification, combustion chambers are connected to heat exchangers to raise the inlet temperature of each of the stages so that the inlet temperature will be in the maximum which can be withstood by the materials of each stage. As in the previous embodiment, this embodiment has a fuel tank 16 for either liquid or gaseous fuel and oxidant tank 21, both of which can be under high pressure. The fuel is led through passage 109 to heat exchanger 110 and then by passage 111 through heat exchanger 112 to passage 113 which connects with the first stage 114 of the engine. The fuel is heated in heat exchanger 110 and heat exchanger 112 serves to raise the temperature of the fuel which passes through the first stage 114 of the engine. Stage 114 exhaust through passage 115 to a heat exchanger 116 which leads through passage 117 to the second stage 118 of the engine. The heat exchanger 116 serves to bring the temperature of the gaseous fuel up to that which can be withstood by the second stage and this second stage exhausts through passage 119 to a heat exchanger 120 which connects through passage 121 to the third stage 122 of the engine. The heat exchanger 120 serves to heat the temperature of the gaseous fuel up to that which can be withstood by the third stage of the engine. The third stage is connected by exhaust passage 123 to the combustion chamber 124 where the first combustion of the fuel takes place. It is understood that any number of stages can be utilized in the engine, such as stage 125 connected to heat exchanger 126 through passage 127.

The oxidant tank 21 connects through passage 128 to heat exchanger 129 which in turn connects with oxidant supply passage 130. The branch pipe 131 connects the passage 130 through valve 132 to the combustion chamber 124 so that a portion of the fuel can be ignited and the products leaving the combustion chamber through line 133 pass through heat exchanger 120 in order to raise the temperature of the fuel in line 121 to the desired value for stage 122. The passage 134 connects heat exchanger 120 with a second combustion chamber 135 which is likewise connected to the oxidant passage 130 through passage 136 and valve 137. The oxidant supply to combustion chamber 135 causes an additional portion of the fuel to be ignited and the products of combustion pass through passage 136' to heat exchanger 116, where the gaseous fuel is raised to the temperature suitable for stage 118. A passage 137' connects a third combustion chamber 138 with the heat exchanger 116 and a passage 139 containing valve 140 connects the combustion chamber 138 with the oxidant passage 130. In combustion chamber 138, additional fuel is ignited and the combustion chamber is connected by passage 141 to heat exchanger 112 which serves to heat the gaseous fuel entering the first stage 114 to a temperature which is compatible with that stage. The outlet of heat exchanger 112 connects through passage 142 with heat exchanger 129 which serves to heat the oxidant which is supplied by line 128 and heat exchanger 129 connects through passage 143 with heat exchanger 110 which serves to heat the fuel entering through passage 109. The heat exchanger 110 then discharges to atmosphere through passage 144. The same types of fuels and oxidants can be utilized in this modification as in the one previously described and instead of having the fuel and oxidant under pressure in tanks 107 and 108, pumps can be incorporated in passages 109 and 128 to increase the pressure of fuel and oxidant respectively in order to obtain highest operating efficiency. Also, it is understood that the various stages 114, 117 and 122 can be any type of reciprocating engine or any type of turbine. The amount of the fuel which is combusted in each of the combustion chambers is, of course, controlled by valves 132, 137 and 140 and the amount of combusted fuel will, of course, control the inlet temperatures to each of the stages by determining the heat transfer at the heat exchanger before each stage.

A physical form of this second modification is illustrated in FIGURES 10 through 12 wherein like reference numerals represent like parts as in the previously described physical embodiment. The first stage of the engine is comprised of the gas engine 45 while the second and third stages are comprised of helical flow turbines 46 and 47 and all of the stages have a common drive shaft 48. The gas engine 45 is of the same construction as the one previously disclosed and has an air-cooled cylinder 55 secured to a crankshaft casing 56 by means of screws 57. The casing 56 contains the crankshaft of the engine which connects with gears in gear box 58 in order to bring the speed of the engine up to the speed of the other stages. The turbine 46 of the second stage has a manifold 49 with branches 50 and 51 leading to the two nozzles of the turbine in the manner described in connection with the previous embodiment. Also, the turbine 47, comprising the third stage, has a manifold 52 with four branches 53, 54, 53' and 54' which lead to the four nozzles of this turbine in the same manner as in the previous embodiment. The turbines 46 and 47 are enclosed by casing sections 61 and 62, which form on each side of the two turbines the lubricating wells 64, 65 and 66, each comprised of a cavity 67 for the lubricant and a cover plate 68. The casing sections are screwed together by means of screws 63 and are secured to the gear box 58 by means of screws 62'. While the three stages of the engine are comprised of the same components as in the previous physical embodiment, it is understood that any type of fluid engine can be utilized at any one of the stages, and that the number of stages can be varied to obtain maximum operating efficiency.

The combustion chambers 124, 135 and 138 are of the same construction as used in the previous embodiment and illustrated in FIGURES 7 and 8. The inlet to the engine 45 is heated to the desired temperature in the heat exchange 112 by the combustion gases from combustion chamber 138 and the engine 45 exhausts through heat exchanger 116 where the exhaust gases are again heated to the desired temperature by the combustion gases from chamber 135 passing through the heat exchanger. The high temperature gases from heat exchanger 116 pass through manifold 49 to the turbine 46 which exhausts to the heat exchanger 120 where the exhaust gases are again heated to the desired temperature by the combustion gases from combustion chamber 124. It is apparent that the driving fluid in all of the stages is pure gaseous fuel and that the fuel is not ignited in the combustion chambers until it has passed through all of the stages. FIGURE 12 illustrates the construction of the heat exchanger 120 and it is understood that the other heat exchangers 112 and 116 are of like construction. The heat exchanger 120 has an outer circular casing 145 which has openings to receive inlet passage 133 and exit passage 134. The passages 119 and 121 are continuous through the center of the casing 145 and this single passage has a helical flange 146 positioned within the chamber 145 in order to provide a large heat exchange surface for transferring heat to the gases exhausting from turbine 46 and passing to turbine 47. This form of the invention has the advantage that the driving fluid is pure gaseous fuel and contains none of the products of combustion.

Another modification of the invention is illustrated in FIGURES 13 through 15 wherein like reference numerals designate like parts as in the previous embodiments. The diagrammatic form of the invention is shown in FIGURE 13 wherein fuel tank 16 is connected to heat exchanger 147 through passage 148 and the heated fuel from heat exchanger 147 passes through line 148' and valve 149 to combustion chamber 150. The oxidant in tank 21 is passed to heat exchanger 151 through passage 152 and the outlet of the heat exchanger connects with combustion chamber 150 through valve 153 and passage 154. The products of combustion from chamber 150 enter one end of a large chamber 155 through passage 156 and a passage 157 connects the other end of chamber 155 with the first stage 158 of the engine. The first stage 158 exhausts through passage 159 to a first heat exchanger 160 located within the chamber 155. The outlet of the heat exchanger 160 connects to the second stage 161 through passage 162 and the second stage exhausts through passage 163 to a second heat exchange 164, likewise located within chamber 155. The heat exchanger 164 has an outlet leading to the third stage 165 through passage 166 and the third stage exhausts through passage 167 to the heat exchangers 151 and 147 connected by passage 168. The heat exchanger 147 has an outlet passage 169 leading to atmosphere. The fuel entering combustion chamber 150 is supplied with sufficient oxidant through passage 154 in order to provide sufficient heat energy to drive the three stages and the high temperature combustion products pass into chamber 155 where the temperature of these combustion products is decreased by the heat exchangers 160 and 164. Thus, the temperature of the exhaust from stage 158 is increased by heat exchanger 160 to the temperature which can be withstood at the inlet of the second stage 161 and the heat exchanger 164 increases the temperature of the exhaust from the second stage 161 to a temperature which can be withstood by the third stage 165. By the time the combustion products enter the passage 157, leading to the first stage of the engine, the temperature of the products has been sufficiently reduced so that the temperature is that which the first stage can withstand. Thus, in the present modification, it is only necessary to utilize one combustion chamber and it is understood that the stages in the engine can take any desired form.

The physical embodiment of this second modification of the invention is illustrated in FIGURES 14 and 15 wherein like reference numerals designate like parts as in the previous embodiment and the first stage of the engine is comprised of a gas engine 45 idential in construction to that used in the other two forms. The gas engine 45 has an air-cooled cylinder 55 which is secured to a crankshaft casing 56 by means of screws 57. A gear box 58 is secured to the casing 56 by means of screws 59 and the gear box contains a gear train to increase the output speed of the gas engine to that corresponding to the other stages. The second and third stages are comprised of helical flow turbines 46 and 47, respectively, which are identical in form to those disclosed in the previous embodiments. The turbines 46 and 47 have outer casing sections 61 and 62 which are secured together by means of screws 63 and the casing sections form bearing compartments 64, 65 and 66. All stages of the engine have a common shaft 48 which is supported by bearings in each of the bearing compartments in the same manner as illustrated in the first embodiment. The passage 157 from chamber 155 leads to the first stage gas engine 45 and the passage 162 from the first heat exchanger 160 leads to the manifold 49 of the second stage turbine 46. The manifold 52 of the third stage turbine is connected to heat exchanger 164 by passage 166. The heat exchangers 147 and 151 and combination chamber 150 can be of the same construction as the heat exchangers and combustion chambers of the previous embodiments and it is understood that valves 149 and 153 regulate the combustion in chamber 150. Referring to FIGURE 15, the chamber 155 is comprised of a cylindrical, divided casing 170 having the passages 156 and 157 connected to opposite ends thereof. The heat exchangers 160 and 164 are both comprised of helical coils which have a series of cylindrical fins 171 in order to effect the transfer of heat to the gases passing through the helical coils so that the temperature of the inlet gases to the second and third stages can be increased by the combustion gases flowing through chamber 155. Due to this transfer of heat, the gases leaving chamber 155 have been reduced to a temperature satisfactory for the first stage 45 of the engine. In this modification of the invention, only a single combustion chamber is utilized and all the stages are driven by the same combustion products.

The present invention provides a non-air breathing engine which operates efficiently independent of the surrounding medium and each modification of the engine is divided into a sufficient number of stages to permit the attainment of a low specific fuel consumption without having the temperature at any one stage rise above that which can be withstood by practical construction materials. In each modification, the shaft 48 can drive any suitable type of propelling device, either directly or through gearing, and for high altitude flight, the propelling device can either be a large propeller of high pitch or ducted fan and, of course, the usual underwater propeller can be used for propelling submarine craft. It is preferred to use liquid hydrogen as the fuel since it can be compressed to high pressures with a small expenditure of energy and also has a high specific heat. Also, liquid oxygen is preferred as the oxidant since it can likewise be compressed to high pressures in the storage tank. It has also been determined that the engine of the invention will have a specific fuel consumption of less than 1 pound of fuel per horsepower hour, which compares favorably with the values obtainable by air-breathing internal combustion engines operating at ground level.

In all forms of the invention, liquid hydrogen can be raised in tank 16 to a high pressure with only a small expenditure of energy. The high pressure hydrogen enters the heat exchanger which receives the high temperature engine exhaust and leaves this heat exchanger as hot hydrogen gas at the pressure of the fluid in the tank. Similarly, as previously mentioned, a pump can be used to increase the pressure of the liquid hydrogen passing to the heat exchanger if the substance is stored as a low pressure liquid in tank 16. This again requires little expenditure of energy compared with what would have to be expended were the hydrogen carried at atmospheric conditions of pressure and temperature as a gas and raised to a corresponding pressure. If the pressure of the hydrogen upstream of the heat exchanger is above the critical pressure, the hydrogen will of course be gaseous in form at this point and the heat exchanger will serve to increase the temperature of this gas. Thus, the design of the heat exchanger can be simplified in form. By using hydrogen gas as the diluent in each of the cycles, an excellent working fluid is provided because of the high specific heat of hydrogen. In other words, by using pure hydrogen gas as a working fluid in the stages and heat exchangers of all forms of the invention, more energy per pound of diluent or working fluid is available at any given temperature than is available from most other known stable materials. It is understood that the exhaust from all forms of the engine can contain some pure hydrogen gas so that hydrogen gas will be available in each stage and in each heat exchanger of the various working cycles.

As previously pointed out, the various stages of the engine can be any suitable type of turbine or gas engine. It is understood that the preferred forms of the invention have been disclosed herein but that other arrangements of combustion chambers and heat exchangers can be utilized to accomplish the combustion of the fuel without exceeding the maximum temperature which can be withstood by the engine construction material. Also, it is understood that the fuel tank and oxidant tank can be insulated in any suitable manner to prevent evaporation of the liquid fuels and oxidants under high pressure. Various other modifications of the invention are contemplated by those skilled in the art without departing from the spirit and scope of the invention as hereinafter defined by the appended claims.

What is claimed is:

1. An engine comprising separate fuel and oxidant supply means, said engine being divided into a plurality of stages with the inlet to each stage except the first connected to the preceding stage by conduit means which passes through a heat exchanger through which the exhaust line from the final stage also passes in heat transfer relationship, passage means for connecting the inlet of said first stage to said fuel supply means through an additional heat exchanger in heat exchange relationship with said exhaust line downstream of the aforementioned heat exchanger so that uncombusted fuel passes through all stages for developing power, a combustion chamber in the exhaust line from the last stage upstream of the heat exchanger for the last stage and separate combustion chambers in the exhaust line upstream of the heat exchanger for each stage so that said exhaust from the last stage passes serially through the combustion chamber leading to the last stage heat exchanger, through the last stage heat exchanger and then successively through the combustion chamber and heat exchanger for each preceding stage, and additional conduit means for connecting each of said combustion chambers to said oxidant supply means for combusting a portion of said exhaust in order to raise the inlet temperature for each stage.

2. The structure as set forth in claim 1 wherein there is provided, in addition, two other heat exchangers through which the exhaust line passes from said additional heat exchanger to the atmosphere, the first said other heat exchanger being in said additional conduit means of the oxidant supply and the second being in the passage means of the fuel supply upstream of said additional heat exchanger.

References Cited by the Examiner

UNITED STATES PATENTS

| | | | |
|---|---|---|---|
| 730,248 | 6/1903 | Friedenthal | 60—36 |
| 1,988,456 | 1/1935 | Lysholm | 60—73 |
| 2,268,270 | 12/1941 | Traupel | 60—39.17 |
| 2,280,765 | 4/1942 | Anxionnaz | 60—39.17 |
| 2,298,663 | 10/1942 | Traupel | 60—73 |
| 2,346,179 | 4/1944 | Meyer | 60—73 |
| 2,423,527 | 7/1947 | Steinschlaeger | 60—39.17 |
| 2,653,443 | 9/1953 | Mercier | 60—39.17 |
| 2,795,109 | 6/1957 | Hryniszak | 60—39.51 |
| 2,970,439 | 2/1961 | Berl | 60—39.82 |

FOREIGN PATENTS

| | | |
|---|---|---|
| 473,704 | 5/1951 | Canada. |
| 6,342 | 7/1907 | Great Britain. |
| 14,245 | 6/1906 | Great Britain. |

JULIUS E. WEST, *Primary Examiner.*

SAMUEL LEVINE, *Examiner.*